US006359990B1

(12) United States Patent
Norris

(10) Patent No.: US 6,359,990 B1
(45) Date of Patent: Mar. 19, 2002

(54) PARAMETRIC RING EMITTER

(75) Inventor: Elwood G. Norris, Poway, CA (US)

(73) Assignee: American Technology Corporation, San Diego, CA (US)

( * ) Notice: Subject to any disclaimer, the term of this patent is extended or adjusted under 35 U.S.C. 154(b) by 0 days.

(21) Appl. No.: 09/135,732

(22) Filed: Aug. 18, 1998

Related U.S. Application Data

(63) Continuation-in-part of application No. 08/846,637, filed on Apr. 30, 1997.

(51) Int. Cl.[7] .................................................. H04B 3/00

(52) U.S. Cl. .............................. 381/77; 381/75; 381/82

(58) Field of Search .............................. 381/75, 77, 82, 381/373; 181/171, 179, 180

(56) References Cited

U.S. PATENT DOCUMENTS 4,005,278 A * 1/1977 Gorike ....................... 381/373
4,418,248 A * 11/1983 Mathis ....................... 381/373
4,429,194 A * 1/1984 Kamon ....................... 381/373
4,433,750 A * 2/1984 Neese ......................... 181/179
4,908,805 A 3/1990 Sprenkels et al.
5,357,578 A 10/1994 Taniishi
5,844,998 A * 12/1998 Nageno ...................... 381/373

FOREIGN PATENT DOCUMENTS

JP 60150399 A 8/1985
JP 2-265400 A 10/1990

OTHER PUBLICATIONS

Masahide Yoneyama, Jun–ichiroh Fujimoto, Yu Kawamo, Shoichi Sasabe "Audio Spotlight: An Application of Nonlinear Interaction of Sound Waves to a New Type of Loudspeaker Design" J. Acoustical Society of America 73(5), May 1983, pp. 1532–1536.

H.O. Berktay, T.G. Muir "Arrays of Parametric Receiving Arrays" The Journal of the Acoustical society of America, pp. 1377–1383.

Kenichi Aoki, Tomoo Kamakura, Yoshiro Kumamoto "Parametric Loudspeaker—Characteristics of Acoustic Field and Suitable Modulation of Carrier Ultrasound" Electronics and Communications in Japan, Part 3, vol. 74, No. 9, 1991, pp. 76–80.

* cited by examiner

*Primary Examiner*—Minsun Oh Harvey
(74) *Attorney, Agent, or Firm*—Thorpe North & Western, LLP

(57) ABSTRACT

A sound emiting device for providing at least one new sonic or subsonic frequency as a by-product of emitting a waveform of at least two ultrasonic frequencies whose difference in value corresponds to the desired new sonic or subsonic frequency. The device includes a parametric emitting perimeter positioned around a central open section. This open section is structured with a diagonal width greater than a cross-sectional diagonal of the parametric emitting perimeter. An ultrasonic frequency signal source and sonic/subsonic frequency generator are coupled together to a modulating circuit for mixing an ultrasonic frequency signal with an electrical signal corresponding to the at least one new sonic or subsonic frequency. The modulator output is coupled to the emitting perimeter which comprises ultrasonic frequency emitting material for propagating the mixed waveform into air for demodulating the waveform to generate the at least one new sonic or subsonic frequency.

28 Claims, 2 Drawing Sheets

PARAMETRIC RING EMITTER

This is a continuation-in-part application of copending application, Ser. No. 08/846,637, entitled "Light Enhanced Bullhorn", filed Apr. 30, 1997.

BACKGROUND OF THE INVENTION

1. Field of the Invention

This invention pertains to sound projection devices. More particularly, the present invention relates to a device and method for enhancing a directional parametric speaker while reducing the quantity of ultrasonic emitters required.

2. State of the Art

Recent developments have been made involving sound propagation from parametric speakers, acoustic heterodyning, and other forms of modulation of multiple ultrasonic frequencies to generate a new frequency. In theory, sound is developed by the interaction in air (as a nonlinear medium) of two ultrasonic frequencies whose difference in value falls within the audio range. The resulting compression waves are projected within the air as a nonlinear medium.

An interesting property of parametric sound generation is enhanced directionality. Despite significant publications on ideal theory, however, general production of sound for practical applications has alluded the industry for over 100 years. Specifically, a basic parametric or heterodyne speaker has not been developed which can be applied in general applications in a manner such as conventional speaker systems.

A brief explanation of the theoretical parametric speaker array is provided in "Audio spotlight: An application of nonlinear interaction of sound waves to a new type of loudspeaker design" by Yoneyama et al as published in the *Journal of Acoustic Society of America,* 73(5), May 1983. Although technical components and the theory of sound generation from a difference signal between two interfering ultrasonic frequencies is described, the practical realization of a commercial sound system was apparently unsuccessful. Note that this weakness in the prior art remains despite the assembly of a parametric speaker array consisting of as many as 547 piezoelectric transducers yielding a speaker diameter of 40–50 cm. Virtually all prior research in the field of parametric sound has been based on the use of conventional ultrasonic transducers, typically of bimorph character.

A common structural feature of prior art attempts to develop an effective parametric speaker is to form a substantially continuous array of transducers across the surface of a support plate. The natural assumption appears to be that filling in the interior area of the support plate with the maximum number of transducers is appropriate to maximize sound pressure level (SPL). Conventional speaker theory would suggest that increasing the number of transducers would in deed contribute to increased SPL. Accordingly, prior art parametric speakers are typically illustrated with bimorf transducers compactly positioned in honeycomb array.

Although such parametric speakers have created some interest, it has seemingly been restricted to scientific curiosity. The development of practical applications and products has been very limited. The efficiency of such systems has apparently not been adequate to suggest utility in applications as part of a commercial audio speaker system.

OBJECTS AND SUMMARY OF THE INVENTION

It is an object of the present invention to provide a method and apparatus for indirectly emitting new sonic and subsonic waves with less power requirements than with prior art parametric speakers.

It is another object to structurally adapt a parametric speaker to produce a narrow beam of new sonic or subsonic energy with less distortion and using less emitter surface than previously experienced with parametric speakers of comparable beam diameter.

A further object of this invention is to increase efficiency of a parametric system by significant reduction in emitter surface area without a corresponding proportional reduction in SPL.

These and other objects are realized in a parametric speaker device which comprises a support base having a sonic or subsonic emitting perimeter positioned around a central open section, wherein the open section has a diagonal width greater than a cross-sectional diagonal of the emitting perimeter of the support base. The device may also include circuitry components such as an ultrasonic frequency signal source for generating a first ultrasonic signal, a sonic or subsonic frequency generator for supplying an electrical signal corresponding to the at least one new sonic or subsonic frequency, and a modulating circuit coupled to the ultrasonic frequency signal source and sonic or subsonic frequency generator for mixing the first ultrasonic frequency signal with the electrical signal corresponding to the at least one new sonic frequency to thereby generate a waveform including the first ultrasonic frequency signal and a second ultrasonic frequency signal. The emitting perimeter comprises ultrasonic frequency emitting material which can be coupled to an output of the modulating means for (i) propagating a waveform embodying both the first and second ultrasonic frequency signals, and (ii) generating the at least one new sonic frequency as a by-product of interaction between the first and second ultrasonic frequency signals.

The invention is also represented by a method for enhancing efficiency of a parametric speaker system with respect to energy output based upon emitter surface area, comprising the steps of a) forming an ultrasonic frequency emitting perimeter on a support base around an open region which is substantially void of ultrasonic emitting material; and b) emitting ultrasonic frequency from the emitting perimeter to generate sonic or subsonic sound within surrounding air as part of a parametric speaker system.

Other objects, features and benefits will be apparent to those skilled in the art, based on the following detailed description, in combination with the accompanying drawings.

DETAILED DESCRIPTION OF THE PREFERRED EMBODIMENT

Figure 1:
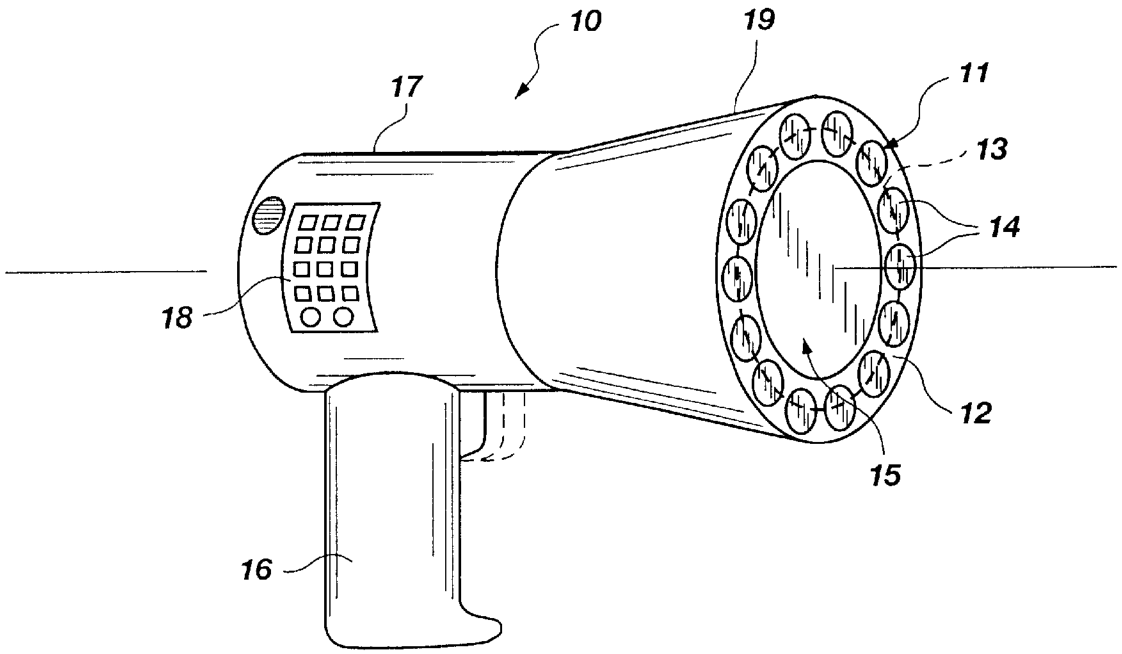
FIG. 1 illustrates a perspective view of a bullhorn device incorporating a circular parametric emitting perimeter.

FIG. 1 illustrates one embodiment of a parametric speaker system useful for sound propagation. It will be apparent that this specific structure is intended to represent many different types of projection devices such as general speakers, stereo systems, PA systems, megaphones, etc., particularly where a direction orientation in a narrow beam is desired.

This basic system comprises a sound emitting device 10 for providing at least one new sonic or subsonic frequency as a by-product of emitting at least two ultrasonic frequencies from an ultrasonic frequency emitter 11. This is in accordance with the general principles of acoustic heterodyning as referenced above. A support plate 12 forms a base or housing for supporting an audio emitting perimeter 13 of ultrasonic frequency emitting material 14. The support plate may be comprised of virtually any material which operates to stabilize the emitter 11 in its desired perimeter configuration. Plastics, metals, dielectrics, ceramics and woods are illustrative of this broad choice of compositions. FIG. 1 shows a bullhorn application with a handle 16, circuitry housing 17 with control pad 18, and a support housing 19 for supporting the support plate with emitting perimeter.

The emitter material 14 comprises bimorf transducers of conventional design and is configured for attachment to the support plate around a central open section 15 which is at least partially bounded by the emitter material. The significance of developing a parametric speaker having the emitting perimeter format arises from the ability of the parametric speaker to supply unusually efficient sound output, despite the use of emitter material only at the perimeter. This unique feature of parametric speakers enables a perimeter emitter to provide comparable audio output to a fully embodied emitter array with emitter material extending across the full area of the support plate. Because the perimeter configuration has a substantially reduced number of ultrasonic transducers or emitter surface area, less drive voltage is required and enhanced efficiency results.

Figure 2:
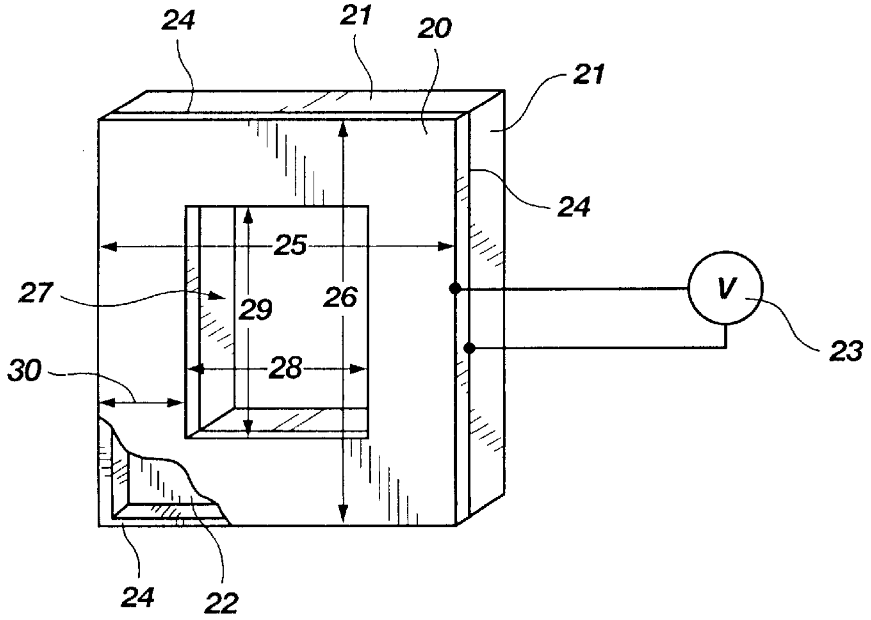
FIG. 2 depicts perspective view of a rectangular emitting perimeter utilizing PVDF emitting film.

Various forms of emitter devices may be used in this perimeter configuration. Traditionally, parametric speakers have utilized bimorf transducers. The present inventor has developed effective parametric output with PVDF film, as well as electrostatic emitter structures. The selection of material will be a function of desired shape of the support plate, as well as the type of audio range desired. For example, FIG. 2 illustrates a midrange speaker using piezoelectric or PVDF film 20, a substrate 21 for supporting the film in suspended state above a cavity 22, and a voltage source with attendant audio signal 23. The rectangular configuration is suitable for a film-type emitter because the film can be placed in tension across the opposing sides or diametric edges 24 to provide proper tension in the film. For determining roll off parameters for low range frequencies, the diameter of the speaker is measured along the horizontal axis 25 or vertical axis 26. Normally, the longer diameter (in this example, 25) will control.

The central section 27 is an open portion in the substrate 21 and emitter 20. The horizontal diameter 28 of the opening is approximately twice the distance 30 across a cross-section of the emitting perimeter. This forms a ratio of 0.5 for this orientation. The vertical opening spans a distance 29 which is 5/4ths the distance 30, equivalent to a ratio of approximately 0.4, a more preferred ratio based on empirical results.

Figure 3:
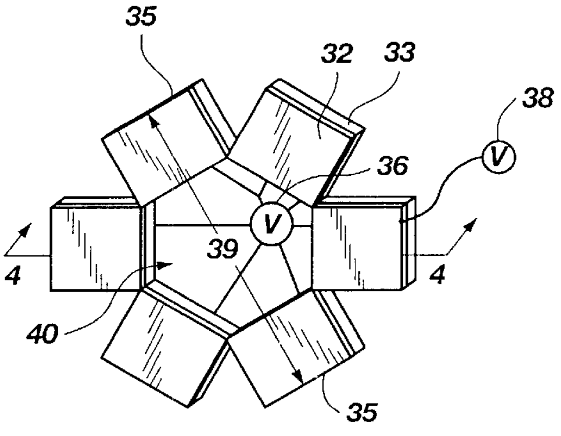
FIG. 3 graphically illustrates an additional embodiment of the present invention incorporating an array of emitter strips to form a polygon configuration.
Figure 4:
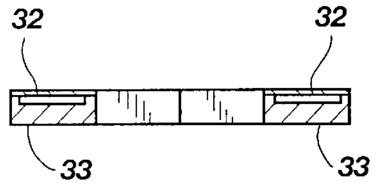
FIG. 4 shows a cross section of the array of FIG. 3, taken along the lines 4—4.

FIGS. 3 and 4 illustrate a hexagon shape, representative of a general polygon configuration. In this example, electrostatic emitters 32 are supported on a stator substrate 33 over a cavity 34, and are arranged along the respective straight diametric edges 35 of the polygon. Each stator 33 is powered in parallel from a driver 36 which is coupled to an audio signal source (not shown). This embodiment is representative of electrostatic speakers generally, and may include a separate biasing circuit 38, as well as electret materials which can be pre-charged to a desired condition. It will be apparent that virtually any speaker shape can be implemented by segmenting the emitter perimeter into a combination of straight segments and/or curves, and by positioning these in end-to-end orientation to circumscribe an open, central region 40. Such shapes need not be symmetrical, but may be of virtually any shape. This flexibility enables the present invention to conform to unusual room shapes and positioning requirements for speaker use.

Figure 5:
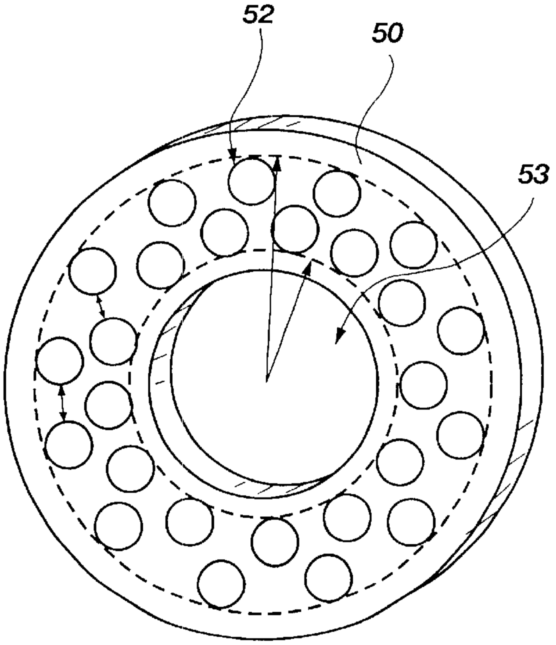
FIG. 5 shows a annular disk with a spaced array of emitter elements in two rings.

FIG. 5 shows a circular ring 50 with an array of bimorf transducers 52 disposed in a double ring format. This is in direct contrast to conventional practice which would dictate that the internal region 53 be filled with transducers to maximize the audio output. The amount of open space in this embodiment has been configured with a ratio of 0.3, based on the relationship of the difference between the outer radius r and the inner radius r. This is represented by the expression $(r_o-r_i)/r_o$. Hereagain, it will be apparent that various numbers of rings could be selected, as well as differing ratios as desired.

The open sections 27, 40, and 53 have primary significance in the present invention with respect to parametric speaker systems. As mentioned above, prior art attempts to develop a commercial parametric speaker have been frustrated by low SPL and nominal performance, particularly at low frequencies. Prior art solutions to these deficiencies have involved maximizing the amount of emitter surface area by packing transducers into a tight cluster or honeycomb configuration. It was believed that by increasing the surface area of radiating speakers, increased air movement would supply a corresponding increase in SPL output. This is consistent with conventional speaker design characteristics for both dynamic and electrostatic speaker systems.

The unexpected phenomenon of the present invention is represented recognizes that ultrasonic emitting elements within a perimeter of the parametric speaker can be removed without seriously affecting the SPL and operation of the speaker device. Indeed, some fringe distortion around the primary frequency and transmission axis appears to be reduced with the elimination of internal emitter devices. Air molecules contained within the beam or column of air appear to be energized, even though the only source of ultrasonic radiation is a virtual circumscribing tubular perimeter of energy. The process of filling the integral region on the support plate with additional ultrasonic emitter material does not appear to offer a proportional increase in SPL. Therefore, the efficiency of the parametric speaker is enhanced by use of a perimeter emitter configuration, as opposed to a continuous emitting surface.

Based on empirical studies, maximum efficiency is realized with a bimorf array as shown in FIG. 5, wherein the emitting perimeter has an outer radius $r_o$ and an inner radius $r_i$ which falls within the ratio of $r_o-r_i/r_o$ having a value within the numerical range of 0.1 to 1.0. The preferred efficiency of 0.3 is produced with a preferred range of 0.2 to 0.4. Other emitter configurations and materials will likely vary from these exemplary ranges for the disclosed bimorf array. In general terms, the present invention is characterized in part by the ratio of (i) a difference between the inner radius and the outer radius of the emitting perimeter, to (ii) the outer radius of the emitting perimeter being within a numerical range of 0.1 to 1.0, or within a more preferred numerical range of 0.2 to 0.4.

In view of the foregoing relationships, it is apparent that the direction of propagation is a function of both the ring diameter and the space configuration of the internal region. A planar relationship for the emitter materials offers the most efficient system for several reasons. First, this planar configuration requires the least number of emitters to circumscribe the maximum area. Secondly, the planar relationship maximizes the in-phase relationship between each emitter. This is significant, in order to reduce SPL loss from phase cancellation.

FIG. 5 also illustrates an additional feature of the present invention wherein the bimorf emitters are spaced from each other to provide a surrounding separation distance from adjacent emitters. Such a concept of spaced positioning appears to offer further economy by reducing the amount of emitter surface within defined rings of specific diameters. In other words, by reducing emitter material with the specific ring configuration, a further reduction in cost is achieved, yet proportional reductions in SPL do not occur. These open segments 55 can be empirically adjusted to optimize the parametric output, while maintaining the desired radial or diametric relationships mentioned above. Generally, the gaps formed by this displacement will range from 0.5 to 2.0 cm, and more preferably, from 0.2 to 1.5 cm. This concept is developed further in a continuation in part application filed by the present inventor.

Figure 6:
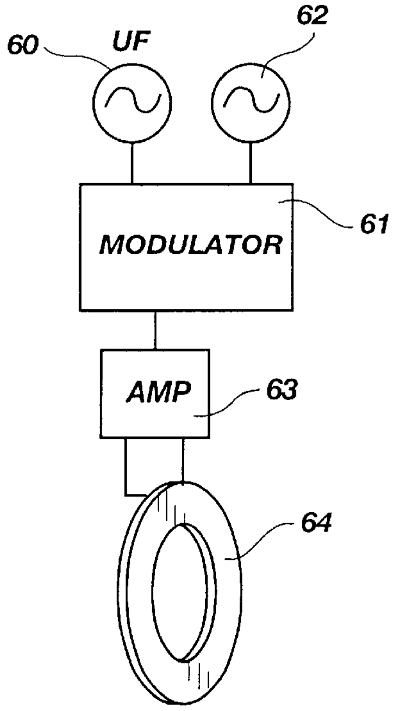
FIG. 6 illustrates a block diagram of typical circuitry associated with a parametric speaker.

A description of the remaining speaker components will briefly identify operating elements generally necessary to drive a parametric speaker as shown in FIG. 6. An ultrasonic frequency signal source 60 is coupled to a modulating device 61 for providing a first ultrasonic frequency signal. Typically, this frequency is considered the carrier signal and will operate at a specific value within the ultrasonic range from 40 Khz to approximately 80 Khz. Actual frequency value, however, will be a function of desired operation parameters. For example, higher frequencies will be absorbed in air more rapidly than lower frequencies. Therefore, the desirable energy of higher frequencies is mitigated by loss of active interference or interaction along the ultrasonic beam. Lower frequencies will extend the length of the ultrasonic radiation, thereby extending the length of active interference or interaction which converts the ultrasonic energy to indirect audio output.

A sonic or subsonic frequency generator 62 is provided for supplying an electrical signal corresponding to the new sonic or subsonic frequency. This may be music, audio of general form, or even subsonic radiation. This sonic or subsonic source is mixed with the carrier signal in a modulating device such as a conventional AM modulator 61. A modified waveform having the first ultrasonic frequency as a carrier with single or double sidebands as the second ultrasonic frequencies is thereby provided to a power amplifier 63, and is directed to the emitter ring 64. Parametric output is developed in accordance with principles as described above.

It will be apparent to those of ordinary skill in the art that the foregoing example are merely exemplary of the inventive principles disclosed herein. Accordingly, these specific embodiments are not to be considered limiting, except as defined in the following claims.

I claim:

1. A sound emitting device for providing at least one new sonic frequency as a by-product of emitting at least two ultrasonic frequencies from an ultrasonic frequency emitter, said device comprised of:

an audio emitting perimeter positioned around a central open section, said open section having a diagonal width greater than a cross-sectional diagonal of the emitting perimeter of the support base, said audio emitting perimeter, said audio emitting perimeter having a directional orientation along a transmission axis;

an ultrasonic frequency signal source for generating a first ultrasonic signal;

a sonic or subsonic frequency generator for supplying an electrical signal corresponding to the at least one new sonic or subsonic frequency;

modulating means coupled to the ultrasonic frequency signal source and sonic or subsonic frequency generator for mixing the first ultrasonic frequency signal with the electrical signal corresponding to the at least one new sonic frequency to thereby generate a waveform including the first ultrasonic frequency signal and a second ultrasonic frequency signal;

said emitting perimeter comprising ultrasonic frequency emitting material coupled to an output of the modulating means for (i) propagating a waveform embodying both the first and second ultrasonic frequency signals, and (ii) generating the at least one new sonic frequency as a by-product of interaction between the first and second ultrasonic frequency signals.

2. A device as defined in claim 1, wherein the audio emitting perimeter comprises a circular array of ultrasonic emitters.

3. A device as defined in claim 1, wherein the ultrasonic emitters comprise a circular array of bimorf transducers.

4. A device as defined in claim 1, wherein the audio emitting perimeter comprises a circular configuration of ultrasonic emitter film.

5. A device as defined in claim 4, wherein the circular array is configured in multiple segments which collectively define at least portions of said audio emitting perimeter.

6. A device as defined in claim 4, wherein the circular configuration includes multiple segments which form arcuate sectors of the audio emitting perimeter.

7. A device as defined in claim 1, wherein the emitting perimeter is configured with a circular geometry.

8. A device as defined in claim 5, wherein the emitting perimeter comprises a substantially continuous circular array of arcuate sectors in end-to-end relationship.

9. A device as defined in claim 1, wherein the audio emitting perimeter comprises a rectangular configuration of ultrasonic emitters.

10. A device as defined in claim 1, wherein the audio emitting perimeter comprises a rectangular array of bimorf transducers.

11. A device as defined in claim 1, wherein the audio emitting perimeter comprises a rectangular configuration of ultrasonic film emitter members.

12. A device as defined in claim 11, wherein the rectangular configuration is in multiple segments which collectively define said audio emitting perimeter.

13. A device as defined in claim 11, wherein the rectangular configuration comprises multiple segments which are configured as linear sectors which collectively define larger straight line sections of the audio emitting perimeter.

14. A device as defined in claim 11, wherein the emitting perimeter is configured with a rectangular geometry.

15. A device as defined in claim 11, wherein emitting perimeter comprises a substantially continuous rectangular array of straight line sectors in end-to-end relationship.

16. A device as defined in claim 1, wherein the audio emitting perimeter comprises a polygon configuration of ultrasonic emitters.

17. A device as defined in claim 16, wherein the audio emitting perimeter comprises a polygon array of bimorf transducers.

18. A device as defined in claim 16, wherein the audio emitting perimeter comprises a polygon array of ultrasonic film emitter members.

19. A device as defined in claim 18, wherein the polygon array is configured in multiple segments which collectively define said audio emitting perimeter.

20. A device as defined in claim 18, wherein the polygon array is configured in multiple segments which are configured as linear sectors which collectively define larger straight line sections of the audio emitting perimeter.

21. A device as defined in claim 18, wherein the emitting perimeter is configured with a polygon geometry.

22. A device as defined in claim 18, wherein emitting perimeter comprises a substantially continuous polygon array of straight line sectors in end to end relationship.

23. A device as defined in claim 1, wherein a ratio of (i) a difference between an inner radius and an outer radius of the emitting perimeter, to (ii) the outer radius of the emitting perimeter is within a numerical range of 0.1 to 1.0.

24. A device as defined in claim 23, wherein the ratio is within the numerical range of 0.2 to 0.4.

25. A device as defined in claim 1, wherein the ultrasonic frequency emitting materials comprise a single ring surrounding a region without ultrasonic emitting material.

26. A device as defined in claim 1, comprising a plurality of rings of ultrasonic frequency emitting material concentrically oriented.

27. A device as defined in claim 11, wherein the emitting material comprises piezoelectric film material positioned in tension to provide an emitting diaphragm.

28. A device as defined in claim 11, wherein the emitting material comprises a dielectric film having a conductive layer for providing an electrostatic emitter membrane.

* * * * *